US011239910B2

United States Patent
Yutani

(10) Patent No.: US 11,239,910 B2
(45) Date of Patent: Feb. 1, 2022

(54) OPTICAL TRANSCEIVER AND METHOD FOR SETTING SAME

(71) Applicant: NEC Corporation, Tokyo (JP)

(72) Inventor: Katsuhiro Yutani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/964,688

(22) PCT Filed: Jan. 24, 2019

(86) PCT No.: PCT/JP2019/002218
§ 371 (c)(1),
(2) Date: Jul. 24, 2020

(87) PCT Pub. No.: WO2019/151101
PCT Pub. Date: Aug. 8, 2019

(65) Prior Publication Data
US 2021/0058152 A1 Feb. 25, 2021

(30) Foreign Application Priority Data
Jan. 30, 2018 (JP) .............................. JP2018-013157

(51) Int. Cl.
*H04B 10/516* (2013.01)
*H04B 10/073* (2013.01)
(Continued)

(52) U.S. Cl.
CPC ........... *H04B 10/073* (2013.01); *H04B 10/40* (2013.01); *H04B 10/516* (2013.01); *G02B 6/4246* (2013.01); *G02B 6/4278* (2013.01)

(58) Field of Classification Search
CPC .................. H04B 10/50; H04B 10/501; H04B 10/516–564
See application file for complete search history.

(56) References Cited

U.S. PATENT DOCUMENTS

| 2015/0155686 A1* | 6/2015 | Berkram | ............. H01S 5/06808 |
| | | | 372/29.021 |
| 2016/0105244 A1 | 4/2016 | Akiyama | |

(Continued)

FOREIGN PATENT DOCUMENTS

| EP | 2624484 A1 | 8/2013 |
| JP | 2013160956 A | 8/2013 |

(Continued)

OTHER PUBLICATIONS

CFP Multi-Source Agreement, Specification revision 1.0, Mar. 23, 2009, http://www.cfp-msa.org/Documents/CFP-MSA-DRAFT-rev-1-0.pdf (Year: 2009).*

(Continued)

*Primary Examiner* — Nathan M Cors

(57) ABSTRACT

A method for setting a pluggable optical transceiver, includes: amplifying, with an amplifier, an electrical signal being input to the pluggable optical transceiver from an external device to which the pluggable optical transceiver is mounted, and outputting the amplified electrical signal as a drive signal of an optical modulator; modulating light input from a light source with the optical modulator, based on the drive signal, and outputting the modulated light; monitoring amplitude of the drive signal; and executing a control sequence being set in advance for at least one of the amplifier and the optical modulator when detecting that amplitude of the drive signal exceeds a reference value being set in advance.

12 Claims, 7 Drawing Sheets

(51) Int. Cl.
H04B 10/40 (2013.01)
G02B 6/42 (2006.01)

(56) References Cited

U.S. PATENT DOCUMENTS

| | | | | |
|---|---|---|---|---|
| 2017/0149507 | A1* | 5/2017 | Le Taillandier De Gabory | .......... H04L 27/2623 |
| 2017/0299901 | A1* | 10/2017 | Komatsu | ................ H04B 10/50 |
| 2017/0338896 | A1* | 11/2017 | Zhang | .................. H04B 10/801 |
| 2018/0287710 | A1 | 10/2018 | Komatsu | |
| 2019/0028205 | A1* | 1/2019 | Huang | ............. H04B 10/07955 |

FOREIGN PATENT DOCUMENTS

| | | | | |
|---|---|---|---|---|
| JP | 2015008388 | A | | 1/2015 |
| JP | 2015-220627 | A | | 12/2015 |
| JP | 2016075878 | A | | 5/2016 |
| JP | 6125988 | B2 | | 5/2017 |
| WO | WO2016/056218 | | * | 4/2016 ............. H04B 10/50 |
| WO | WO-2017/056350 | A1 | | 4/2017 |

OTHER PUBLICATIONS

International Search Report corresponding to PCT/JP2019/002218, dated Mar. 26, 2019, 1 page.
Written Opinion corresponding to PCT/JP2019/002218 with English translation, dated Mar. 26, 2019, 6 pages.

* cited by examiner

OPTICAL TRANSCEIVER AND METHOD FOR SETTING SAME

CROSS-REFERENCE TO RELATED APPLICATIONS

This application is a national stage application of International Application No. PCT/JP2019/002218 entitled "OPTICAL TRANSCEIVER AND METHOD FOR SETTING SAME," filed on Jan. 24, 2019, which claims the benefit of the priority of Japanese Patent Application No. JP2018-013157 filed on Jan. 30, 2018, the disclosures of each of which are hereby incorporated by reference in their entirety.

TECHNICAL FIELD

The present invention relates to a control technique for an optical transceiver, and particularly relates to a control technique for a pluggable optical transceiver.

BACKGROUND ART

As an optical transceiver that transmits and receives an optical signal, there has been widely used a pluggable optical transceiver configured in such a way as to be insertable and removable with respect to an optical transmission device being a host. The pluggable optical transceiver outputs an optical modulation signal based on a high-speed analog signal being input from the optical transmission device to which the pluggable optical transceiver is mounted.

When the pluggable optical transceiver is connected to the optical transmission device, and performs optical communication, calibration for optimizing each parameter of the optical transceiver is required in order to secure signal quality. The calibration of the pluggable optical transceiver is started by, for example, transmitting a control signal indicating start of calibration from the optical transmission device to the pluggable optical transceiver and writing the control signal into a register of the pluggable optical transceiver. The pluggable optical transceiver executes a control sequence for controlling calibration for each component, and writes information indicating completion into the register at a time of the completion, and thus a state of allowing the optical transmission device to recognize completion of calibration is established.

As a technique for optimizing an operation parameter of a pluggable optical transceiver, for example, a technique as in PTL 1 is disclosed. An optical transmitter in PTL 1 controls a bias voltage applied to a modulator in response to an electrical signal input from an external optical transmission device. In order to secure linearity of an output from an amplifier to the modulator, the optical transmitter in PTL 1 controls an amplification factor of the amplifier, based on a monitor result of amplitude. Further, similarly in PTL 2, a setting technique for an operation parameter of a pluggable optical transceiver is described.

CITATION LIST

Patent Literature

[PTL 1] Japanese Unexamined Patent Application Publication No. 2015-220627
[PTL 2] Japanese Patent No. 6125988

SUMMARY OF INVENTION

Technical Problem

However, the techniques in PTLs 1 and 2 are not sufficient for the following matters. In recent years, a signal processing circuit and a pluggable optical transceiver have been used in various combinations by multi-vendorizing and the like in many cases, and it is desired that a sequence of transmitting and receiving a signal therein is simplified as much as possible. However, PTL 1 does not disclose how an external optical transmission device starts calibration for setting an amplification factor. Thus, with the technique in PTL 1, there may be a risk that the number of times of transmission and reception of a signal between the optical transmission device and the pluggable optical transceiver is increased at a time of performing a calibration operation. Further, with the technique in PTL 1, control is required for setting procedures and timings that are different depending on a combination of the optical transmission device and the pluggable optical transceiver, and hence there may be a risk that a function and management of control firmware are complicated. Similarly, PTL 2 does not disclose how the external optical transmission device starts calibration. Thus, the techniques in PTLs 1 and 2 are not sufficient as a technique in which a pluggable optical transceiver starts a control sequence of calibration with a configuration being as simple as possible.

In order to solve the above-mentioned problem, an object of the present invention is to provide a pluggable optical transceiver that detects an input of a signal from an external device and autonomously starts execution of a control sequence.

Solution to Problem

In order to solve the above-mentioned problem, a pluggable optical transceiver according to the present invention includes an electrical signal input means, an amplification means, a modulation means, an optical signal output means, and a control means. The electrical signal input means causes an electrical signal to be input via a connector from an external device to which the pluggable optical transceiver is connected. The amplification means amplifies the electrical signal being input via the connector from the external device, and outputs the amplified electrical signal as a drive signal for performing optical modulation. The modulation means modulates light being input from a light source, based on the drive signal, and outputs the modulated light. The optical signal output means causes an optical fiber to which the optical signal modulated by the modulation means is output, to be connected. The control means monitors amplitude of the drive signal output from the amplification means, and executes a control sequence being set in advance for at least one of the amplification means and the modulation means when detecting that the amplitude of the drive signal exceeds a reference value being set in advance.

A method for setting a pluggable optical transceiver according to the present invention includes, amplifying an electrical signal being input to the pluggable optical transceiver from an external device to which the pluggable optical transceiver is mounted, with an amplifier, and outputting the amplified electrical signal as a drive signal of an optical modulator. The method for setting the pluggable optical transceiver according to the present invention includes, modulating light input from a light source with the optical modulator, based on the drive signal, and outputting the modulated light. The method for setting the pluggable optical transceiver according to the present invention includes, monitoring amplitude of the drive signal, and executing a control sequence being set in advance for at least one of the amplifier and the optical modulator when detecting that the amplitude of the drive signal exceeds a reference value being set in advance.

Advantageous Effects of Invention

According to the present invention, an input of a signal from an external device can be detected, and execution of a control sequence can be autonomously started.

EXAMPLE EMBODIMENT

First Example Embodiment

Figure 1:
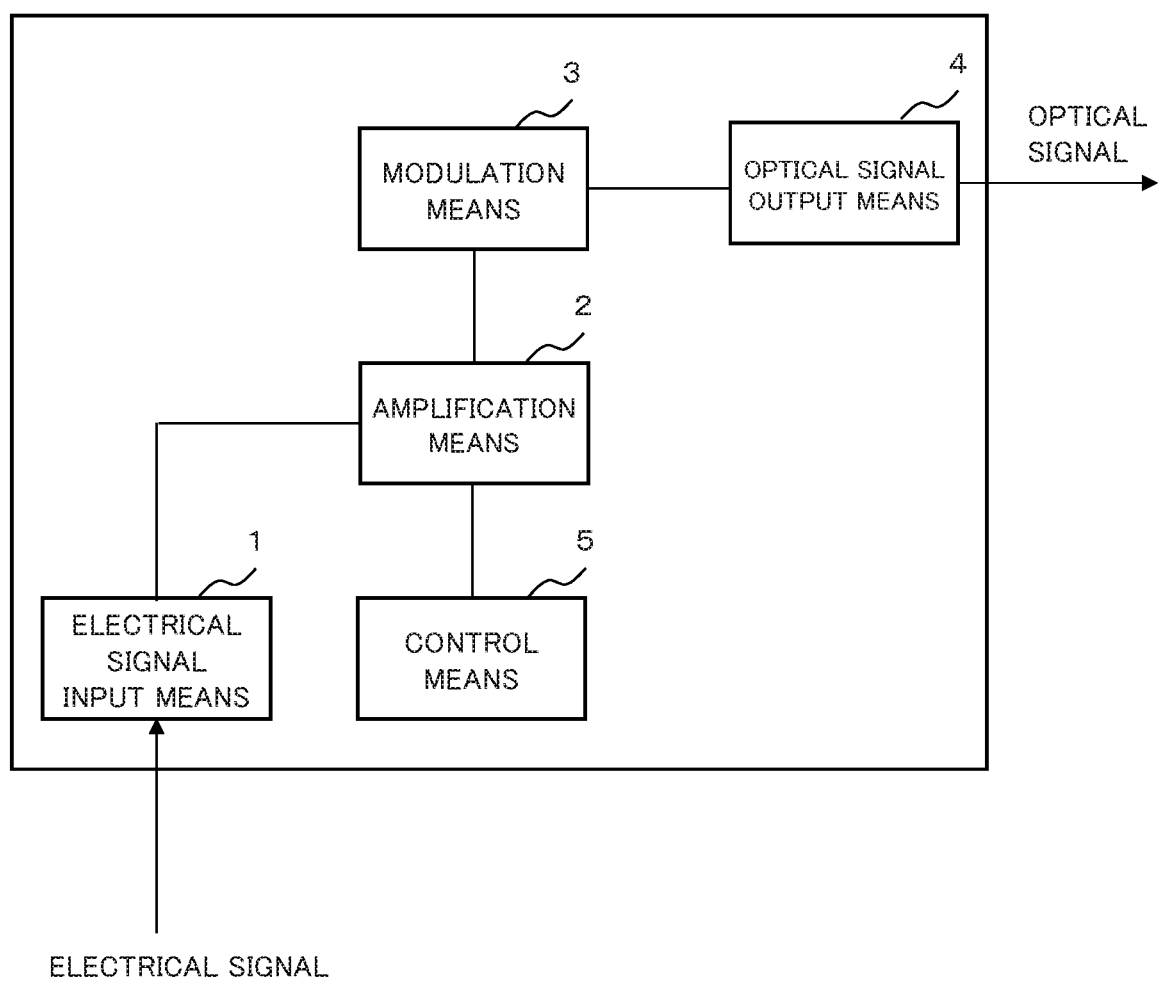
FIG. 1 is a diagram illustrating an outline of a configuration according to a first example embodiment of the present invention.

With reference to the drawings, a first example embodiment of the present invention is described in detail. FIG. 1 illustrates an outline of a configuration of a pluggable optical transceiver according to the present example embodiment. The pluggable optical transceiver according to the present example embodiment includes an electrical signal input means 1, an amplification means 2, a modulation means 3, an optical signal output means 4, and a control means 5. The electrical signal input means 1 causes an electrical signal to be input via a connector from an external device to which the pluggable optical transceiver is connected. The amplification means 2 amplifies the electrical signal being input via the connector from the external device, and outputs the amplified electrical signal as a drive signal for performing optical modulation. The modulation means 3 modulates light being input from a light source, based on the drive signal, and outputs the modulated light. The optical signal output means 4 causes an optical fiber to which the optical signal modulated by the modulation means is output, to be connected. The control means 5 monitors amplitude of the drive signal output from the amplification means 2, and executes a control sequence being set in advance for at least one of the amplification means 2 and the modulation means 3 when detecting that the amplitude of the drive signal exceeds a reference value being set in advance.

In the pluggable optical transceiver according to the present example embodiment, the amplitude of the drive signal being used for performing optical modulation by the modulation means 3 is monitored, and the control sequence being set in advance is executed when it is detected that the amplitude of the drive signal exceeds the reference value being set in advance. Thus, when the external device such as an optical transmission device that inputs an electrical signal to the pluggable optical transceiver inputs, to the pluggable optical transceiver, an electrical signal with amplitude associated to the reference value of the amplitude of the drive signal, execution of the control sequence can be started. Specifically, the pluggable optical transceiver according to the present example embodiment is capable of detecting that the optical transmission device starts outputting a signal with amplitude associated to the amplitude at a time of operation and starting the control sequence with determination of the pluggable optical transceiver. As a result, the pluggable optical transceiver according to the present example embodiment is capable of detecting an input of a signal from the external device and autonomously starting execution of the control sequence.

Second Example Embodiment

Figure 2:
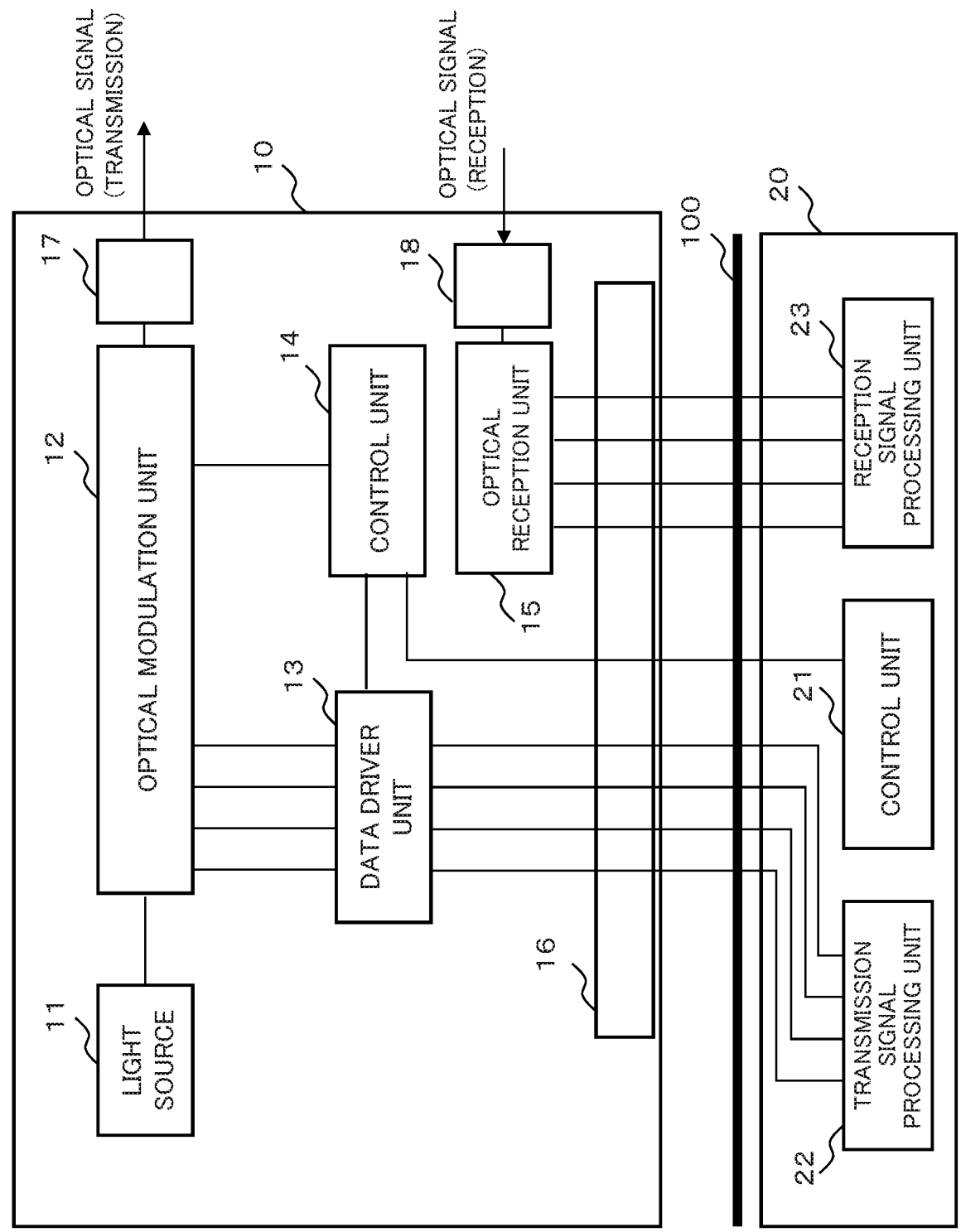
FIG. 2 is a diagram illustrating an outline of a configuration according to a second example embodiment of the present invention.

With reference to the drawings, a second example embodiment of the present invention is described in detail. FIG. 2 illustrates an outline of a configuration of an optical transmission system according to the present example embodiment. The optical transmission system according to the present example embodiment includes a pluggable optical transceiver 10 and an optical transmission device 20. The pluggable optical transceiver 10 is mounted to the optical transmission device 20, generates an optical modulation signal, based on a high-speed analog signal input from the optical transmission device 20, and outputs the generated optical modulation signal. Further, the pluggable optical transceiver 10 converts an optical signal input through a transmission path into an electrical signal, and outputs the converted electrical signal to the optical transmission device 20.

The number of the pluggable optical transceivers 10 that are mounted to the optical transmission device 20 is set based on design of an optical communication network to which the optical transmission system is connected. Further, the optical transmission system according to the present example embodiment is used for an optical communication network with the digital coherent system.

The configuration of the pluggable optical transceiver 10 is described. The pluggable optical transceiver 10 according to the present example embodiment includes a light source 11, an optical modulation unit 12, a data driver unit 13, a control unit 14, and an optical reception unit 15. The pluggable optical transceiver 10 further includes an electrical signal input unit 16, an optical signal output unit 17, and an optical signal input unit 18.

The light source 11 outputs continuous light having a wavelength allocated for each pluggable optical transceiver 10. The light source 11 is formed through use of a semiconductor laser. The light output from the light source 11 is input to the optical modulation unit 12.

The optical modulation unit 12 modulates the light input from the light source 11, and outputs the modulated light. The optical modulation unit 12 modulates the light being input, based on a signal input from the data driver unit 13. As the optical modulation unit 12, a Mach-Zehnder modulator is used. The pluggable optical transceiver 10 according to the present example embodiment is used for the optical transmission system with the digital coherent system, and hence modulation is performed each in in-phase (I) phase and quadrature (Q) phase for an X polarized wave and a Y polarized wave. Thus, the optical modulation unit 12 is formed of four Mach-Zehnder modulators. Further, a function of the optical modulation unit 12 according to the present example embodiment corresponds to the modulation means 3 according to the first example embodiment.

The data driver unit 13 is an amplifier that amplifies a high-speed analog signal input as an electrical signal from the optical transmission device 20 and outputs the amplified signal as a drive signal to each modulator of the optical modulation unit 12. The data driver unit 13 amplifies an analog signal relevant to each of I phase and Q phase for the X polarized wave and the Y polarized wave, and transmits a drive signal relevant to each of the four modulators. Further, the data driver unit 13 further outputs a signal, which is outputs as the drive signal to the optical modulation unit 12, as a monitor signal to the control unit 14. Further, a function of the data driver unit 13 according to the present example embodiment corresponds to the amplification means 2 according to the first example embodiment.

The control unit 14 has a function of performing general control of the pluggable optical transceiver 10. For example, when the pluggable optical transceiver 10 is connected to the optical transmission device 20, the control unit 14 controls setting of an amplification factor of a signal in the data driver unit 13 and calibration of the optical modulation unit 12. The control unit 14 stores, as a control sequence in advance, control contents and an order at the time of controlling the data driver unit 13 and calibration of the optical modulation unit 12.

Further, the control unit 14 monitors a monitor signal input from the data driver unit 13. The control unit 14 determines that the optical transmission device 20 starts an operation of outputting a signal when a magnitude of amplitude of the monitor signal input from the data driver unit 13 exceeds a reference, and starts the control sequence for calibration.

Figure 3:
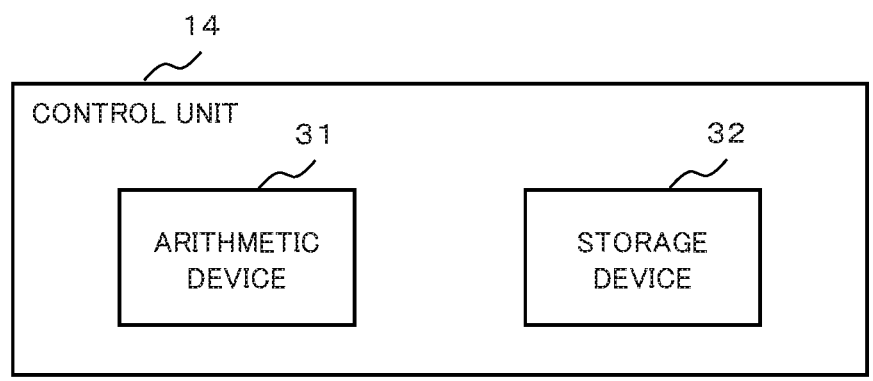
FIG. 3 is a diagram illustrating an outline of a configuration of a control unit according to the second example embodiment of the present invention.

The control unit 14 includes an arithmetic device 31 and a storage device 32. FIG. 3 illustrates an outline of a configuration of the control unit 14 according to the present example embodiment.

For example, the arithmetic device 31 is formed of a central processing unit (CPU), and executes a program for performing each processing such as calibration or monitoring of a monitor signal. The arithmetic device 31 may be formed of a semiconductor device such as a field programmable gate array (FPGA) other than the CPU in such a way as to perform processing such as execution of the control sequence.

The storage device 32 is formed of a semiconductor storage device or the like, and stores the program executed by the arithmetic device 31 and data on the reference of the amplitude at the time of starting calibration.

For example, as the program executed by the arithmetic device 31, a control program for controlling calibration of the optical modulation unit 12 and the data driver unit 13 is stored. Further, the control unit 14 includes a register that stores information indicating completion of calibration as signal reception completion. The optical transmission device 20 refers to the register of the control unit 14, and thus can determine that calibration of the pluggable optical transceiver 10 is completed. The register in which the signal reception completion is stored may be a part of the storage device 32. Further, a function of the control unit 14 according to the present example embodiment corresponds to the control means 5 according to the first example embodiment.

The optical reception unit 15 includes a photodiode, and converts the optical signal, which is input via the optical signal input unit 18, into an electrical signal, and outputs the electrical signal to the optical transmission device 20. The optical reception unit 15 includes a light source for locally generated light, and performs coherent detection of the received signal.

The electrical signal input unit 16 is a connector for connecting a signal line used at the time of inputting an electrical signal from the optical transmission device 20 to the pluggable optical transceiver 10. A function of the electrical signal input unit 16 according to the present example embodiment corresponds to the electrical signal input means 1 according to the first example embodiment.

The optical signal output unit 17 is a connection port for connecting an optical fiber for transmitting an optical signal output from the optical modulation unit 12. A function of the optical signal output unit 17 according to the present example embodiment corresponds to the optical signal output means 4 according to the first example embodiment. Further, the optical signal input unit 18 is a connection port for connecting an optical fiber for receiving an optical signal.

The optical transmission device 20 includes a control unit 21, a transmission signal processing unit 22, and a reception signal processing unit 23. The optical transmission device 20 further includes a connector portion 100 for connecting the pluggable optical transceiver 10. The optical transmission device 20 outputs a signal to the pluggable optical transceiver 10 and receives a signal from the pluggable optical transceiver 10, via the connector portion 100. The number of connector portions 100 is provided depending on the number of pluggable optical transceivers 10 that can be connected to the optical transmission device 20.

The control unit 21 has a function of controlling start of an output of a signal to the pluggable optical transceiver 10, and the like. For example, when it is determined that calibration of the pluggable optical transceiver 10 is completed, and the optical transmission device 20 starts an operation of outputting a signal, the control unit 21 requests the transmission signal processing unit 22 to output a signal to the pluggable optical transceiver 10. Further, by referring to the register of the control unit 14 of the pluggable optical transceiver 10 as described above, the control unit 21 may determine that calibration of the pluggable optical transceiver 10 is completed. Further, the control unit 21 may determine that calibration of the pluggable optical transceiver 10 is completed when a time period being set in advance elapses from the time when an output of a signal to the pluggable optical transceiver 10 is started. The time period for the control unit 21 to determine that calibration of the pluggable optical transceiver 10 is completed may be set in advance, based on a time period required for calibration for each component of the pluggable optical transceiver 10.

The transmission signal processing unit 22 performs processing such as encoding required for transmission through the transmission path, based on a signal being input from another device or a communication path connected to the optical transmission device 20, and generates signal data for transmission through the transmission path. The transmission signal processing unit 22 generates a signal for controlling modulation performed by the optical modulation unit 12 of the pluggable optical transceiver 10, based on the generated signal data for transmission, and outputs the signal as a high-speed analog signal to the data driver unit 13 of the pluggable optical transceiver 10.

The reception signal processing unit 23 performs reception processing such as decoding, based on an electrical signal input from the pluggable optical transceiver 10, and outputs the signal, which is subjected to the reception processing, to the other device or the communication path connected to the optical transmission device 20.

The transmission signal processing unit 22, the control unit 21, and the reception signal processing unit 23 are each formed of a semiconductor device such as a digital signal processor (DSP), and an FPGA.

Figure 4:
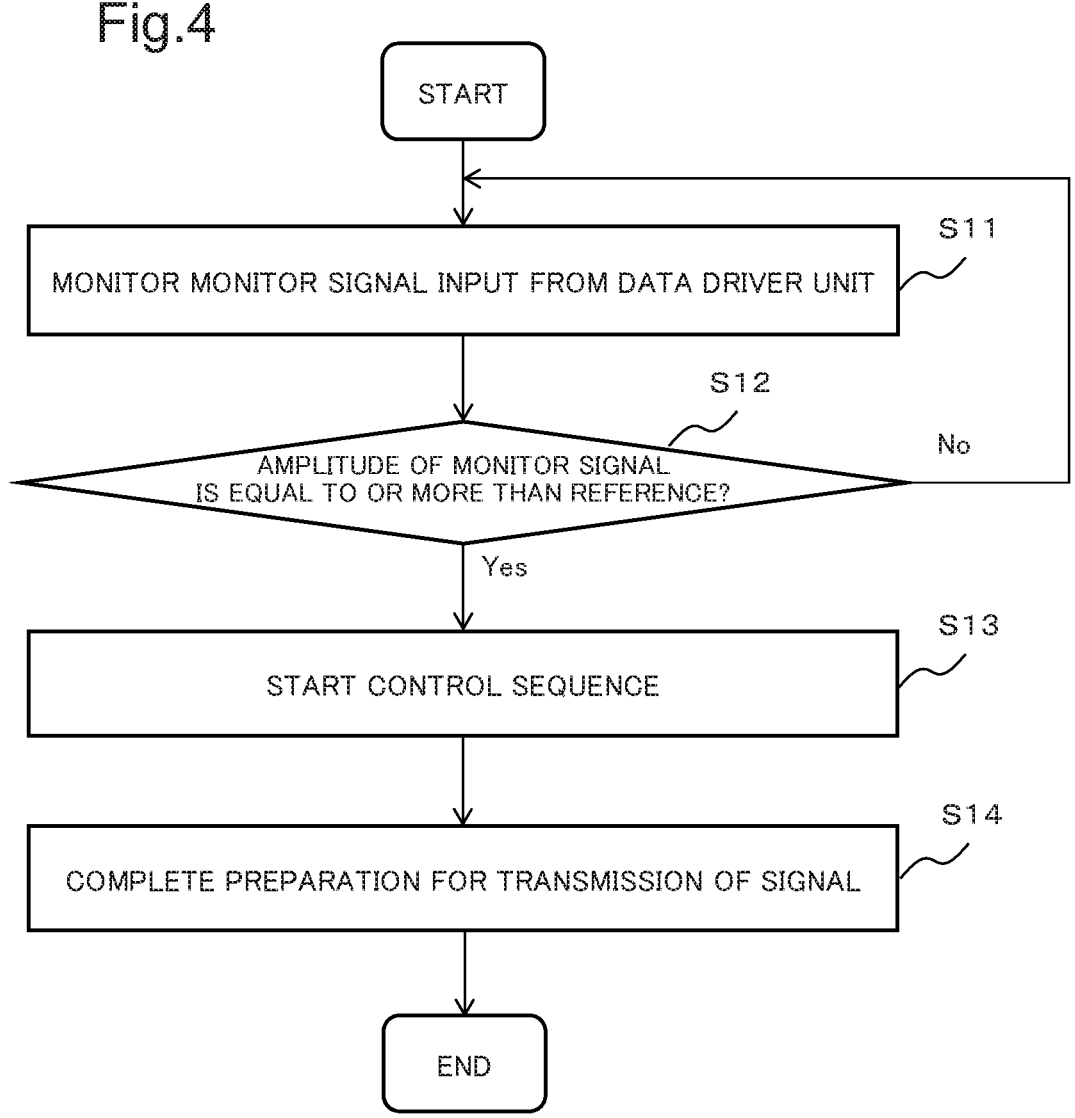
FIG. 4 is a diagram illustrating an operation flow for a pluggable optical transceiver to execute a control sequence according to the second example embodiment of the present invention.

Next, a normal operation of the optical transmission system according to the present example embodiment is described. FIG. 4 illustrates an operation flow of the pluggable optical transceiver 10 according to the present example embodiment.

First, the pluggable optical transceiver 10 is connected to the optical transmission device 20, and the pluggable optical transceiver 10 starts an operation. When connection with the optical transmission device 20 is established, the control unit 14 monitors the monitor signal input from the data driver unit 13 (Step S11).

When the optical transmission device 20 starts an operation after the pluggable optical transceiver 10 is connected to the optical transmission device 20, the optical transmission device 20 starts outputting a signal to the pluggable optical transceiver 10 that requires calibration. When calibration of the pluggable optical transceiver 10 is performed, the transmission signal processing unit 22 of the optical transmission device 20 outputs, to the data driver unit 13 of the pluggable optical transceiver 10, a signal with amplitude at a level equivalent to a case where an analog signal for transmission is output. The analog signal output at this time may be a signal that allows the control unit 14 to detect the amplitude and determine start of calibration.

When the signal is input to the data driver unit 13, the data driver unit 13 amplifies the input signal, and outputs the signal as a monitor signal to the control unit 14. An amplification factor of the data driver unit 13 before performing calibration is set in advance.

When the monitor signal is input, the control unit 14 compares the amplitude of the input monitor signal with a reference value of the amplitude for starting calibration. When the amplitude of the monitor signal is smaller than the reference value (No in Step S12), the control unit 14 continues monitoring a monitor signal.

When the amplitude indicated by the monitor signal is equal to or more than the reference value (Yes in Step S12), the control unit 14 determines that calibration is required from the optical transmission device 20. When it is determined that a request for calibration is received from the optical transmission device 20, the control unit 14 starts the control sequence for calibration (Step S13).

When the control sequence for calibration is completed, the control unit 14 writes data indicating that execution of the control sequence is completed, as signal reception completion data, into the register. When the control sequence is completed, the pluggable optical transceiver 10 completes preparation for transmission and reception of an optical signal (Step S14).

By referring to the register of the pluggable optical transceiver 10, the optical transmission device 20 may determine that calibration of the pluggable optical transceiver 10 is completed. Further, the optical transmission device 20 may determine that calibration of the pluggable optical transceiver 10 is completed when the time period that is set in advance elapses from the time when an output of a signal is started. When it is determined that calibration of the pluggable optical transceiver 10 is completed, the optical transmission device 20 starts an operation of preparing for transmission of an optical signal.

A general optical transmission device mounts all the optical components corresponding to the functions of the digital signal processing circuit and the optical transceiver on the device side, and hence a company or the like that designs or manufactures the optical transmission device can assure quality of the device. However, in a configuration of the insertable/removable optical transceiver, the digital signal processing circuit and the optical transceiver are manufactured by a plurality of companies in some cases. In such case, when the optical transmission device mounted with the digital signal processing circuit and the optical transceiver are coupled, an optimization method for securing signal quality is important.

In such configuration, the optical transmission device is required to input a signal to the optical transceiver after performing a signal input notification and confirming signal input reception completion on the optical transceiver, and hence a complicated control sequence is required in some cases. When the optical transmission device and the optical transceiver are multi-vendorized and supplied from a plurality of companies, a signal transmission/reception order, a timing, and the like are different among the suppliers, and a control firmware that switches a signal input procedure for each supplier of the optical transceiver is required to be implemented. With such configuration, a function and management of the firmware are further complicated, and thus the configuration of the optical transmission system may be complicated. In contrast, in the optical transmission system according to the present example embodiment, the pluggable optical transceiver 10 autonomously starts an operation of calibration when amplitude of a signal being input from the optical transmission device 20 to the pluggable optical transceiver 10 exceeds the reference being set in advance. Thus, through use of the pluggable optical transceiver 10 according to the present example embodiment, the number of times of transmission and reception of a signal between the optical transmission device 20 and the pluggable optical transceiver 10 can be suppressed, and the control sequence for performing calibration of the pluggable optical transceiver 10 can be executed.

In the pluggable optical transceiver 10 according to the present example embodiment, the control unit 14 monitors amplitude of a voltage value of a monitor signal output from the data driver unit 13. When it is detected that the amplitude of the monitor signal is more than the reference value, the control unit 14 executes the control sequence for calibration of the pluggable optical transceiver 10. When the control sequence is executed based on the amplitude of the monitor signal in this manner, the pluggable optical transceiver 10 can autonomously start calibration without performing transmission and reception of a control signal with the optical transmission device 20. Thus, even when a combination of the signal processing circuit of the optical transmission device 20 and the optical transceiver is diversified, start of calibration of the pluggable optical transceiver 10 can be controlled without complicating the configuration. As a result, through use of the pluggable optical transceiver 10 according to the present example embodiment, an input of a signal from the device can be detected, and execution of the control sequence can be autonomously started.

Third Example Embodiment

Figure 5:
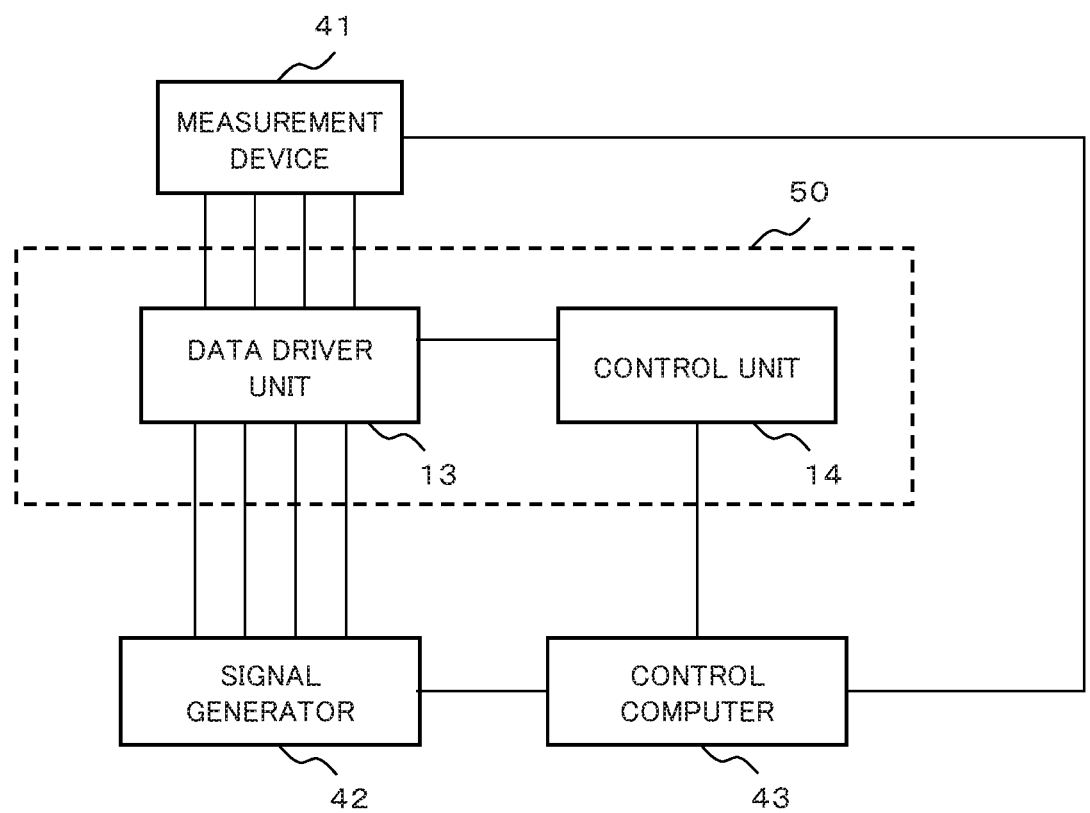
FIG. 5 is a diagram illustrating an outline of a configuration of a setting system according to the third example embodiment of the present invention.

With reference to the drawings, a third example embodiment of the present invention is described in detail. FIG. 5 illustrates an outline of a configuration of a reference setting system according to the present example embodiment. The reference setting system according to the present example embodiment is a system used for setting a reference of amplitude for determining start of calibration in the pluggable optical transceiver 10 according to the second example embodiment.

Among the components of the pluggable optical transceiver 10, FIG. 5 schematically illustrates only a part relating to an electrical circuit 50 that performs control of each of the components of the pluggable optical transceiver 10. The electrical circuit 50 refers to a part of the pluggable optical transceiver 10, which is constituted by the data driver unit 13 and the control unit 14.

Further, the pluggable optical transceiver 10 according to the present example embodiment includes an interface that outputs, to the outside, a drive signal output from the optical modulation unit 12 and data on amplitude of a monitor signal monitored by the control unit 14. Further, the pluggable optical transceiver 10 according to the present example embodiment includes an interface that inputs the reference value of the amplitude for starting calibration, from an external device to the control unit 14. The input and output interface between the control unit 14 and the external device may be shared as the interface for inputting and outputting a control signal from the optical transmission device 20.

The reference setting system according to the present example embodiment includes a measurement device 41, a signal generator 42, and a control computer 43, which are connected to the electrical circuit 50 of the pluggable optical transceiver 10.

The measurement device 41 has a function of measuring an output signal being output as a drive signal from the data driver unit 13 to the optical modulation unit 12. The measurement device 41 measures a waveform of the output signal from the data driver unit 13, and sends the measured waveform data to the control computer 43.

The signal generator 42 has a function of outputting a test signal to the data driver unit 13. The signal generator 42 generates a test analog signal, based on an instruction from the control computer 43, and outputs the generated signal as the test signal to the data driver unit 13.

The control computer 43 has a function of controlling each device when the reference of the amplitude for starting an operation of calibration of the pluggable optical transceiver 10 is set. The control computer 43 sends, to the signal generator 42, a control signal indicating that a test electrical signal is sent to the pluggable optical transceiver 10. The control computer 43 adds information on amplitude of the test electrical signal to the control signal indicating that the test electrical signal is sent, and sends the resultant to the signal generator 42.

The control computer 43 calculates amplitude of the signal from the waveform data measured by the measurement device 41. The amplitude of the signal is calculated as, for example, average amplitude for a time period set in advance.

Further, the control computer 43 acquires, from the control unit 14 of the pluggable optical transceiver 10, the amplitude data on the monitor signal input from the control unit 14. The control computer 43 calculates amplitude of a monitor signal when the amplitude measured by the measurement device 41 becomes the value set in advance, based on the amplitude measured by the measurement device 41 and the amplitude acquired from the control unit 14. The control computer 43 sets the amplitude of the monitor signal when the amplitude measured by the measurement device 41 becomes the value set in advance, as the reference for starting calibration. The control computer 43 writes the set reference amplitude for starting calibration into the control unit 14 of the pluggable optical transceiver 10.

Figure 6:
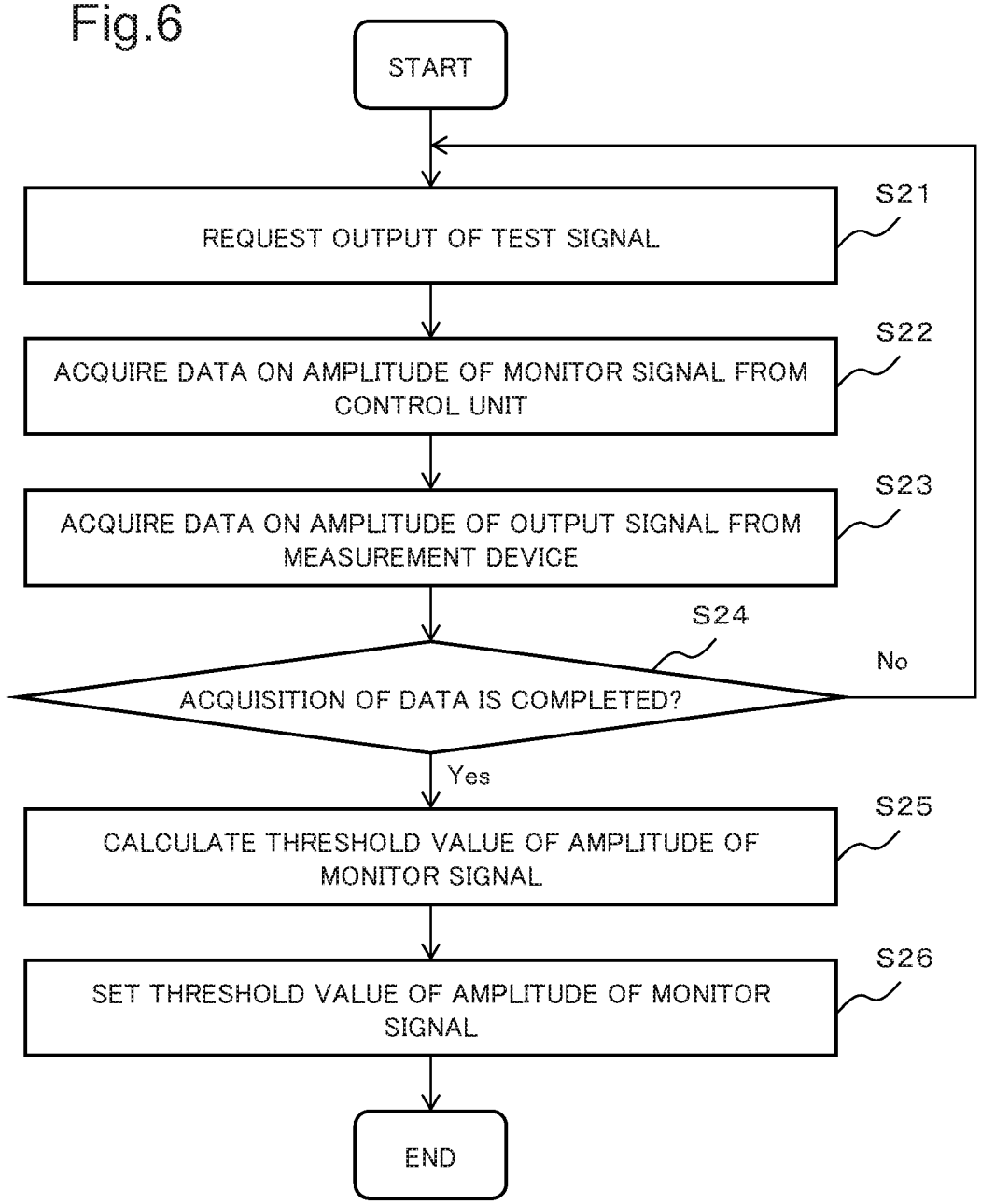
FIG. 6 is a diagram illustrating an operation flow for setting a start condition of the control sequence of the pluggable optical transceiver according to the third example embodiment of the present invention.

Next, a setting operation of the reference of the amplitude of the monitor signal for starting an operation of calibration of the pluggable optical transceiver 10 is described. FIG. 6 is a diagram schematically illustrating an operation flow of setting the reference of the amplitude of the monitor signal for starting an operation of calibration of the pluggable optical transceiver 10.

First, the pluggable optical transceiver 10 is connected to the reference setting system. The reference of the amplitude of the monitor signal for starting an operation of calibration of the pluggable optical transceiver 10 is set at the time of shipment from a factory, installation of the optical transmission system, or the like, for example.

When a worker or the like starts an operation of setting the reference of the amplitude, the control computer 43 requests the signal generator 42 to output the test signal (Step S21).

The amplitude of the test electrical signal sent from the signal generator 42 to the data driver unit 13 is set at a plurality of stages. The control computer 43 selects from the amplitude of the electrical signal set at the plurality of stages in an order from any amplitude, and requests the signal generator 42 to output the test electrical signal. For example, the control computer 43 selects from the amplitude of the electrical signal set at the plurality of stages in the order from smaller amplitude.

When the request for an output of the test signal is received, the signal generator 42 outputs the electrical signal with the designated amplitude as the test signal.

When the test signal is input from the signal generator 42 to the data driver unit 13, the data driver unit 13 amplifies the input test signal, and outputs the resultant. The test signal output from the data driver unit 13 is sent to the measurement device 41. Further, the data driver unit 13 sends a signal for monitoring the amplitude of the output signal, as the monitor signal, to the control unit 14.

The control unit 14 of the pluggable optical transceiver 10 monitors the amplitude of the monitor signal sent from the data driver unit 13. The control unit 14 of the pluggable optical transceiver 10 sends the data on the amplitude of the monitor signal to the control computer 43. When the data on the amplitude of the monitor signal are received and acquired from the control unit 14, the control computer 43 stores the acquired data on the amplitude of the monitor signal (Step S22).

When the signal is input from the data driver unit 13, the measurement device 41 measures the waveform of the input signal, and sends the waveform data to the control computer 43. When a measurement result of the output waveform from the data driver unit 13 is received and acquired from the measurement device 41, the control computer 43 calculates the amplitude from the waveform data. When the amplitude is calculated from the waveform data, the control computer 43 stores data on the calculated amplitude (Step S23). The control computer 43 stores a monitor result of the amplitude from the data driver unit 13 and the data on the amplitude based on the waveform data measured by the measurement device 41 in association with each other.

When the data on the amplitude are stored, the control computer 43 confirms whether all of the pieces of the data on each of the amplitude of the test signal are acquired. When acquisition of the data is not completed (No in Step S24), the control computer 43 sends a signal that requests to output the test signal with amplitude having a subsequent set value, to the signal generator 42, and repeats an operation from Step S21.

When acquisition of the data is completed (Yes in Step S24), the control computer 43 calculates an amplitude of the monitor signal when the signal output from the data driver unit 13 to the measurement device 41, which corresponds to the drive signal, becomes the reference amplitude set in advance.

Figure 7:
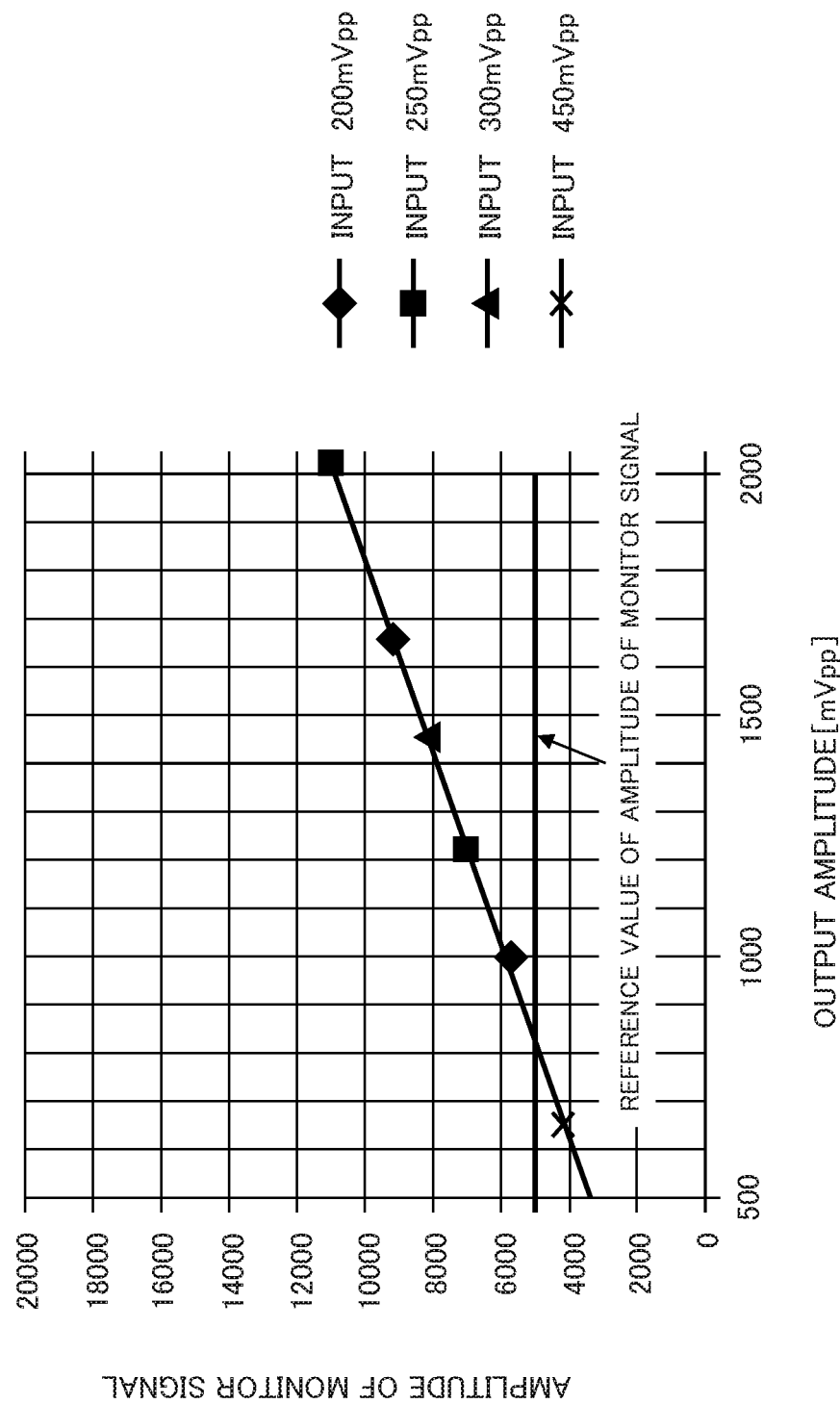
FIG. 7 is a diagram illustrating an example for setting the start condition of the control sequence of the pluggable optical transceiver according to the third example embodiment of the present invention.

FIG. 7 is a graph indicating a relationship between the amplitude of the monitor signal and the amplitude of the signal measured by the measurement device 41. In FIG. 7, the vertical axis indicates the amplitude of the monitor signal, and the horizontal axis indicates the amplitude of the signal measured by the measurement device 41, specifically, the amplitude of the output signal output to the optical modulation unit 12. In the example in FIG. 7, a value based on setting unique to a data driver is used as the value of the amplitude of the monitor signal, but the value of the amplitude of the monitor signal may be a converted value such as a voltage. In the example in FIG. 7, the relationship between the amplitude of the monitor signal and the amplitude of the signal measured by the measurement device 41 is approximated with a linear function equation. The control computer 43 generates the linear function equation indicating the relationship between the amplitude of the monitor signal and the amplitude of the signal measured by the measurement device 41. When the linear function equation is generated, the control computer 43 calculates the amplitude of the monitor signal associated to the amplitude of the output signal set in advance as the amplitude of the output signal for starting calibration, based on the linear function equation.

The control computer 43 sets the calculated amplitude of the monitor signal as a reference value of the amplitude of the monitor signal for determining start of calibration, that is, a threshold value (Step S25). When the reference value for determining start of calibration is calculated, the control computer 43 writes the reference value of the amplitude of the monitor signal for starting calibration, into the storage device 32 of the control unit 14 (Step S26). After the reference value of the amplitude of the monitor signal is written, the control unit 14 is set to start the control sequence when the written reference value of the amplitude of the monitor signal is exceeded. In the example in FIG. 7, in a case of being mounted to the optical transmission device, when the amplitude of the monitor signal exceeds a value indicated with the linear line as the reference value of the amplitude of the monitor signal, the control unit 14 determines that the amplitude of the output signal exceeds the amplitude for starting the control sequence.

In the reference setting system according to the present example embodiment, the test signal is input to the pluggable optical transceiver 10, and the reference value of the amplitude for determining start of calibration is set, based on the relationship between the amplitude of the drive signal input to the optical modulation unit 12 and the monitor signal input to the control unit 14. The reference value is set based on the relationship between the amplitude of the signal measured by the measurement device 41 and the monitor signal input to the control unit 14, and thus start of calibration can be determined when the control unit 14 detects the signal associated to the amplitude of the actual drive signal. As a result, through use of the pluggable optical transceiver 10 whose reference value of the amplitude is set by using the reference setting system according to the present example embodiment, an input of a signal from the optical transmission device 20 being an external device can be detected, and execution of the control sequence can be autonomously started.

The pluggable optical transceiver 10 according to the second example embodiment may be used for an optical communication network other than the digital coherent system. In a case of usage other than the digital coherent system, analog signals associated to the number of modulators included in the optical transceiver, based on a communication system, are input from the optical transmission device to the optical transceiver, and optical modulation signals are generated through amplification and modulation of the analog signals. Further, the pluggable optical transceiver 10 according to the second example embodiment includes a configuration of transmitting and receiving an optical signal, but may have a configuration of performing only transmission.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2018-13157, filed on Jan. 30, 2018, the disclosure of which is incorporated herein in its entirety by reference.

REFERENCE SIGNS LIST

1 Electrical signal input means
2 Amplification means
3 Modulation means
4 Optical signal output means
5 Control means
10 Pluggable optical transceiver
11 Light source
12 Optical modulation unit
13 Data driver unit
14 Control unit
15 Optical reception unit
16 Electrical signal input unit
17 Optical signal output unit
18 Optical signal input unit
20 Optical transmission device
21 Control unit
22 Transmission signal processing unit
23 Reception signal processing unit
31 Arithmetic device
32 Storage device
41 Measurement device
42 Signal generator
43 Control computer
50 Electrical circuit
100 Connector portion

The invention claimed is:

1. A pluggable optical transceiver, comprising:
    an electrical signal input unit configured to cause an electrical signal to be input via a connector from an external device to which the pluggable optical transceiver is connected;
    an amplification unit configured to amplify the electrical signal being input via the connector from the external device, and output the amplified electrical signal as a drive signal for performing optical modulation;
    a modulation unit configured to modulate light being input from a light source, based on the drive signal, and output the modulated light;
    an optical signal output unit configured to cause an optical fiber to which an optical signal modulated by the modulation unit is output, to be connected;
    a control unit configured to start to monitor amplitude of the drive signal output from the amplification unit when the pluggable optical transceiver is connected to the external device, and execute a control sequence being set in advance for at least one of the amplification unit and the modulation unit when detecting that the amplitude of the drive signal exceeds a reference value being set in advance; and
    a storage unit configured to store the reference value, wherein the storage unit stores the reference value being input from the external device.

2. The pluggable optical transceiver according to claim 1, wherein
    the amplification unit outputs the drive signal to the modulation unit and the control unit.

3. A system for setting a pluggable optical transceiver, comprising:
    the pluggable optical transceiver according to claim 1;
    a measurement unit configured to measure amplitude of the drive signal;
    an acquisition unit configured to acquire amplitude of the drive signal from the control unit of the pluggable optical transceiver; and
    a setting control unit configured to set the reference value for the control unit executing the control sequence, based on the amplitude of the drive signal measured by the measurement unit and the amplitude acquired from the control unit.

4. The system for setting the pluggable optical transceiver according to claim 3, wherein
    the control unit outputs a test signal to the pluggable optical transceiver, and
    the amplification unit of the pluggable optical transceiver amplifies the test signal, and outputs the amplified test signal as the drive signal.

5. The pluggable optical transceiver according to claim 1, wherein
    the control unit informs the external device an indication that execution of the control sequence is completed when the control sequence is completed.

6. The pluggable optical transceiver according to claim 1, wherein
    the reference value is a value corresponding to an amplitude of the electrical signal for the external device transmitting.

7. An optical transmission system, comprising:
    the pluggable optical transceiver according to claim 1; and
    an optical transmission device configured to output an electrical signal based on data transmitted via a transmission path, to the pluggable optical transceiver, wherein
    the amplification unit of the pluggable optical transceiver amplifies the electrical signal being input from the optical transmission device being the external device, and outputs the amplified electrical signal as the drive signal.

8. A method for setting a pluggable optical transceiver, comprising:
    amplifying, with an amplifier, an electrical signal being input to the pluggable optical transceiver from an external device to which the pluggable optical transceiver is mounted, and outputting the amplified electrical signal as a drive signal of an optical modulator;
    modulating light input from a light source with the optical modulator, based on the drive signal, and outputting the modulated light;
    starting to monitor amplitude of the drive signal when the pluggable optical transceiver is connected to the external device;
    executing a control sequence being set in advance for at least one of the amplifier and the optical modulator when detecting that amplitude of the drive signal exceeds a reference value being set in advance; and
    storing the reference value being input from the external device.

9. The method for setting the pluggable optical transceiver according to claim 8, wherein:
    the reference value being input from an outside, is stored in the pluggable optical transceiver; and
    the control sequence for at least one of the amplifier and the optical modulator is executed when detecting that amplitude of the drive signal exceeds the reference value being stored.

10. The method for setting the pluggable optical transceiver according to claim 8, further comprising:
    measuring amplitude of the drive signal;
    acquiring amplitude of the drive signal from the pluggable optical transceiver; and
    setting the reference value for executing the control sequence, based on the amplitude of the drive signal being measured and the amplitude being acquired from the pluggable optical transceiver.

11. The method for setting the pluggable optical transceiver according to claim 10, further comprising:
    outputting a test signal to the pluggable optical transceiver; and
    amplifying the test signal with the amplifier of the pluggable optical transceiver, and setting the reference value, based on the amplitude of the drive signal.

12. The method for setting the pluggable optical transceiver according to claim 9, further comprising:
    measuring amplitude of the drive signal;
    acquiring amplitude of the drive signal from the pluggable optical transceiver; and
    setting the reference value for executing the control sequence, based on the amplitude of the drive signal being measured and the amplitude being acquired from the pluggable optical transceiver.

* * * * *